United States Patent

Dahmen et al.

[11] 4,198,469
[45] Apr. 15, 1980

[54] METHOD FOR THE MANUFACTURE OF CARBON BLACK

[75] Inventors: Karel R. Dahmen, Houston; John M. Clay, Dumas, both of Tex.

[73] Assignee: Continental Carbon Company, Houston, Tex.

[21] Appl. No.: 864,161

[22] Filed: Dec. 30, 1977

Related U.S. Application Data

[63] Continuation-in-part of Ser. No. 780,218, Mar. 23, 1977, abandoned.

[51] Int. Cl.² .......................... C01B 31/02; C09C 1/48
[52] U.S. Cl. .................................... 423/450; 423/455; 423/456
[58] Field of Search ............... 23/259.5; 423/449, 450, 423/456, 453; 422/150

[56] References Cited

U.S. PATENT DOCUMENTS

| | | | |
|---|---|---|---|
| 3,203,767 | 8/1965 | Middlebrooks | 23/259.5 |
| 3,477,816 | 11/1969 | Shepherd | 23/259.5 |
| 3,658,289 | 4/1972 | Hodges | 23/259.5 |
| 3,918,914 | 11/1975 | Johnson | 423/450 |
| 3,990,854 | 11/1976 | Dahmen | 23/259.5 |

*Primary Examiner*—O. R. Vertiz
*Assistant Examiner*—Gregory A. Heller
*Attorney, Agent, or Firm*—Jerry B. Peterson

[57] ABSTRACT

A process for manufacturing oil furnace carbon black in which all or a portion of the combustion air is swirled just prior to contacting the fuel. The portion of total air which is swirled is adjustable so as to provide a predetermined, controlled Swirl Ratio in order to control the structure of the resulting carbon black.

3 Claims, 3 Drawing Figures

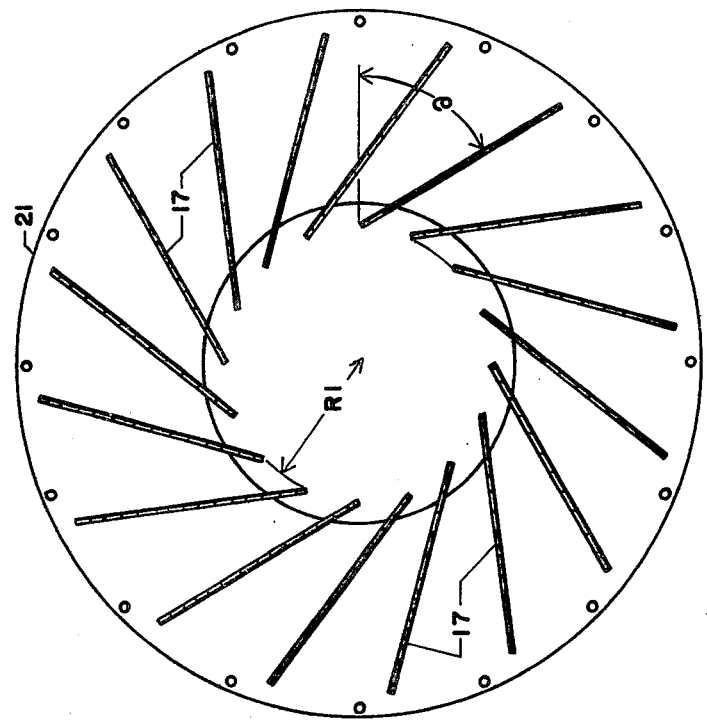
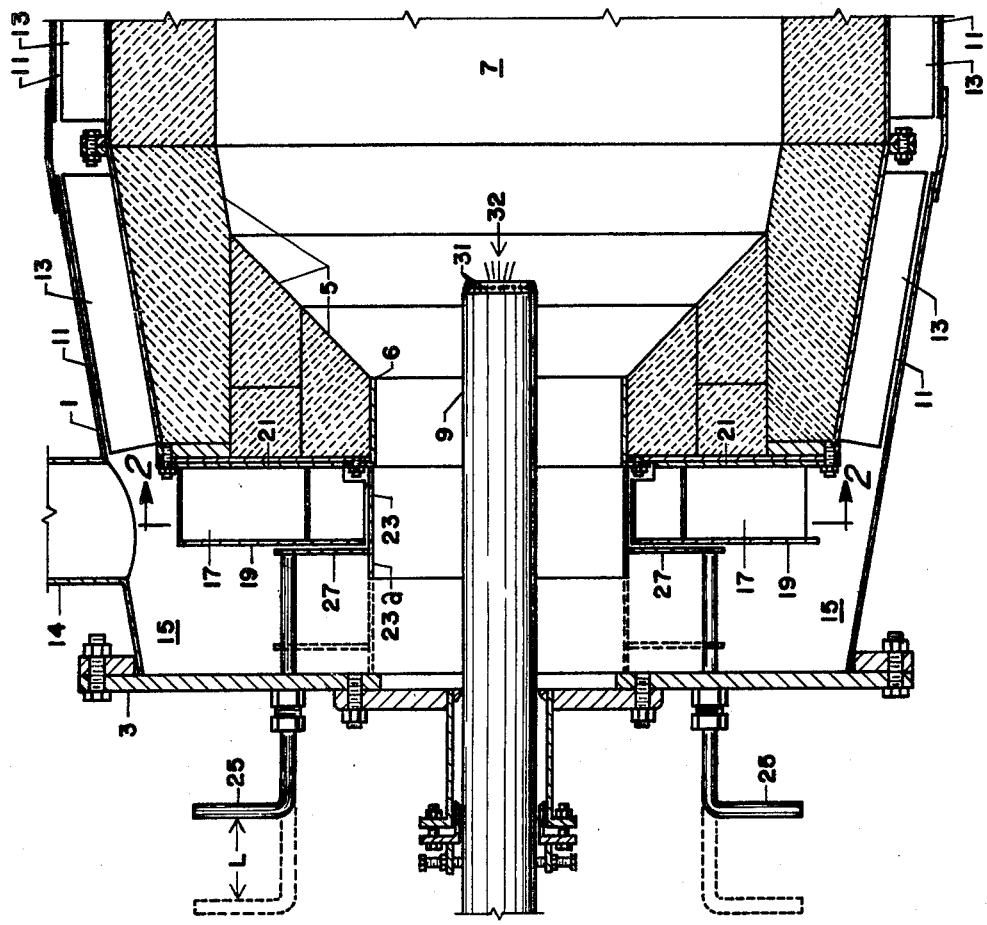

METHOD FOR THE MANUFACTURE OF CARBON BLACK

CROSS REFERENCE TO RELATED APPLICATION

This is a continuation-in-part of Ser. No. 780,218, filed Mar. 23, 1977 now abandoned.

BACKGROUND OF THE INVENTION

This invention concerns the manufacture of carbon black by the oil furnace process, and more particularly, the control of the structure of carcass grades of carbon black by means of use of a quantitatively controlled swirl of the combustion air introduced into the reactor.

DESCRIPTION OF THE PRIOR ART

U.S. Pat. Nos. 3,681,031 and 3,918,914 to Paul H. Johnson bear a superficial resemblance to this invention in that they are directed to the use of differing rotational velocities of hot combustion gases to vary the structure of the black. There are, however, significant differences: (1) Johnson discloses that increased velocities result in decreasing structure, whereas we are able to increase the structure, under certain conditions, by the use of increased swirl; (2) Johnson varies the rotational velocity of the entire stream of combustion products whereas we are able to accomplish our objectives by varying only the swirl of the incoming combustion air; (3) the Johnson apparatus is entirely different because he varies the velocity of the entire stream of combustion products.

SUMMARY OF THE INVENTION

This invention is a method and apparatus for control of the structure of carcass grades of oil furnace carbon blacks by swirling the combustion air as it enters the combustion zone before it contacts the fuel in the upstream end of the reactor, and controlling the Swirl Ratio of the air so as to control the structure of the black.

BRIEF DESCRIPTION OF THE DRAWINGS

FIG. 1 is a longitudinal view, partly in section, of the upstream end of one suitable form of a carbon black reactor including the preferred means for imparting swirl to the combustion air.

FIG. 2 is a view, taken along the line 2—2 of FIG. 1.

DESCRIPTION OF THE PREFERRED EMBODIMENTS

Figure 3:
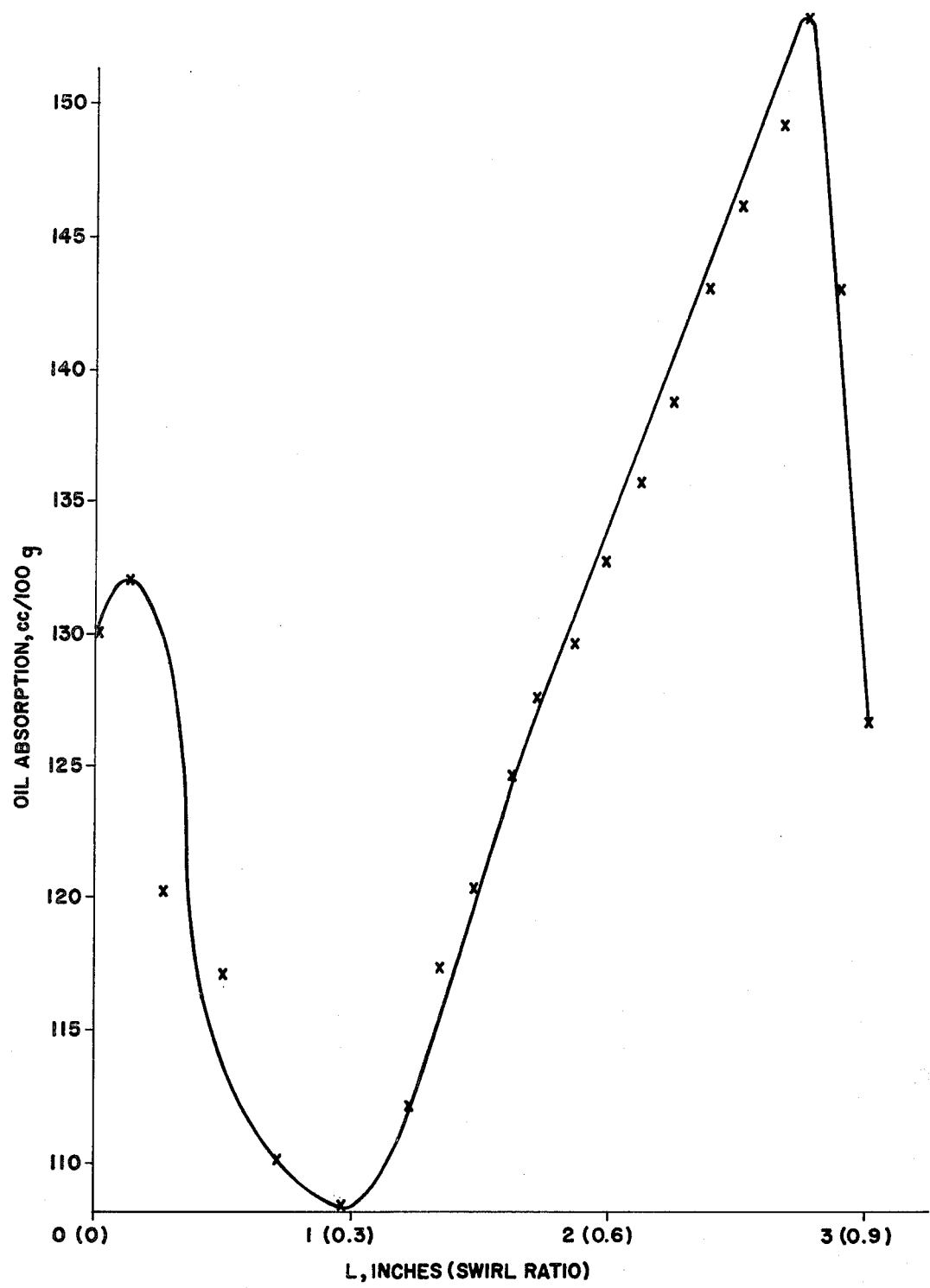
FIG. 3 is a plot of Swirl Ratio versus the oil absorption of the carbon black, derived from a test run.

Referring to FIG. 1, the upstream end of a suitable carcass grade reactor is shown generally comprising cylindrical housing 1, face plate 3, refractories 5 defining the reaction chamber 7, axial burner and feedstock injection assembly 9. The downstream poriton of the reactor is not shown because its specific design is not a part of this invention.

The refractories 5 in FIG. 1 define a section diverging rather quickly to reaction chamber or zone 7. This configuration is not critical, and in some cases it may be preferable to use a configuration providing a more gradual divergence.

The diameter of the reaction chamber 7 is largely a matter of choice, and diameters of 25 to 50 inches and even greater are feasible.

The combustion air is preferably brought into the housing toward the downstream portion thereof (not shown) and is preferably passed toward the upstream end through annulus 11 in order to preheat the air. Annulus 11 preferably contains straightening vanes 13 so that the air is flowing longitudinally as it enters plenum 15. Oxygen or oxygen-enriched air could be used in place of air. Pipe 14 is simply a vent, not material to the invention, to allow air to be passed through the annulus 11 for cooling purposes when production is interrupted.

A plurality or cascade of swirling vanes 17 are affixed to circular plates 19 and 21 and cover only part of the plenum 15. An axially moveable cylindrical sleeve serves to control the amount of swirl imparted to the combustion air by causing none, part, or all of the air to enter the reactor through the cascade of swirling vanes. The sleeve 23 is moveable from outside of the reactor by means of adjustable handles 25 (preferably three equispaced 120° apart) affixed to circular plate 27 which is in turn affixed to sleeve 23. Thus, with sleeve 23 in the closed position shown in solid lines in FIG. 1, the flow through the swirling vanes would be blocked. and as a result, there would be no swirl of air and the Swirl Ratio would be zero. With the sleeve in the open position shown in dotted lines, the swirl would be at its maximum because all of the air would be forced through the cascade of swirling vanes 17 by means of the fact that portion 23a of sleeve 23 is sized to block off flow of straight air when positioned so as to completely open the cascade.

There is nothing critical about the design of the burner and feedstock injection assembly 9, which can be axially and centrally located as in FIG. 1. Referring to FIG. 1 as a suitable arrangement, natural gas or other fuel enters the reactor axially as in FIG. 1, exits holes 31 and is burned by the combustion air. Other gas or liquid fuel burners would be acceptable. For example, as an alternate to axial introduction of fuel, the fuel (gas or liquid) can be introduced radially into the reactor from a plurality of nozzles directed inwardly from the outer periphery of the reactor, in which case the nozzles would be supplied by pipes radially penetrating the reactor immediately downstream of the swirling vanes 17.

The feedstock nozzle (hidden by burner pipe 9 in FIG. 1) can be any one of several types such as a pressure atomizing or air (or steam) atomizing nozzle, for example by axial injection from a single nozzle as shown at 32 in the drawing, or by radial injection from a plurality of nozzles directed inwardly from the outer periphery of the reactor or outwardly from the axis of the reactor towards the periphery. Although the feedstock nozzle can be hidden by pipe 9 as in FIG. 1, it may be extended beyond the downstream end of pipe 9 if desired to adjust the properties of the carbon black. One advantage of this invention is that high structure carcass grade blacks can be produced, using high Swirl Ratios, without the need to use special feedstock injection devices such as wide angle high pressure atomizing nozzles or wide angle swirl atomizing nozzles which are liable to result in formation of coke on the wall of the reactor.

Another advantage of the invention is that low structures can be obtained with less or no feedstock additive.

Although a full explanation of theory of operation of this invention is neither necessary nor feasible, a few principles are worthy of explanation.

The technology of "Confined Jets" shows that the aero-dynamical patterns do not only change upon a switch from straight entry to swirling entry air but that important changes in the expansion of the entry pattern and in the strength as well as the dimensions of reverse flow fields occur when the Swirl Ratio is changed. See H. L. Wu and N. Fricker, "An Investigation of the Behavior of Swirling Jet Flames in a Narrow Cylindrical Furnace," Chapter IX of the Proceedings of the International Flame Research Institute at Ijmuiden. The Swirl Ratio is a dimensionless number, independent of flow rates and —as long as conditions within the swirl generator are isothermal—it is only dependent on geometrical adjustment. See J. M. Beer and N. A. Chigier, "Combustion Aerodynamics," Section 5.2, Halsted Press Division, John Wiley & Sons, Inc., New York.

This invention essentially realizes such quantitative control of the Swirl Ratio. Assuming the variation in Reynold's number to be negligible, the Swirl Ratio "S" of the air entering through the cascade of vanes 17 (with sleeve 23 in open position) depends on the geometrical dimensions.

$$S = \frac{1}{1-\psi} \cdot \frac{\tan \cdot \delta}{1 + \tan \cdot \delta \cdot \tan \cdot (180/z)^\circ}$$

where $\psi = zt/2\pi R_1 \cos\delta$ $\delta$ = angle of vane to radius $R_1$ = radius of inner diameter of vane cascade, inches t = thickness of vanes, inches z = number of vanes

EXAMPLES

The data in FIG. 3 was obtained in a series of tests using a reactor, as shown in FIGS. 1 and 2, having the following parameters:

$\delta = 60^\circ$ $R_1 = 8.5$ inches $t = \frac{3}{8}$ inch $z = 16$ $\psi = 0.0374$ When sleeve 23 is in the open position (shown in dotted lines in FIG. 1), S equals 1/34. For a partially open position, $S = 1.34 \times (A_s/A_t)$ wherein $A_s$ is the area open for entry of swirling air and $A_t$ is the total area open for both swirling air and straight air. Inasmuch as the total area $A_t$ is fixed for any established selection of dimensions, S is proportional to $A_s$ which in turn is proportional to the setting of handle 25, i.e., the distance L in FIG. 1. Therefore, $S = 1.34 \times L/W$ wherein W is the width of vanes 17.

The tests were made using a conventional highly-aromatic carbon black feedstock oil and an air atomizing feedstock nozzle, utilizing the following dimensions and conditions:

| | |
|---|---|
| Width (W) of swirling vanes | 4 inches |
| Length of swirling vanes | 15¼ inches |
| $R_1$ | 8.5 inches |
| Inside diameter of sleeve 23 | 16¼ inches |
| Distance holes 31 downstream of point 6 | 10 inches |
| Distance from end of gas pipe 9 to feedstock nozzle | 7 inches |
| Oil pressure | 50–54 |
| Oil rate | 535 |
| Oil preheat | 370° F. |
| Feedstock additive | None |
| Air rate, SCFH | 295,000 |
| Air/gas ratio | 21 |

The iodine number was controlled to a value close to 35 as measured by test procedure ASTM D-1510-70.

The position of sleeve 23 was varied during the series of runs, by adjusting the position of handle 25 over a range of L=0–3 inches. At each position, a sample of loose (fluffy) black was obtained and tested for oil absorption, which is a test indicative of structure conducted as follows.

DESCRIPTION OF OIL ABSORPTION TEST PROCEDURE

1. General

This test is essentially one in which alkali-refined linseed oil is mixed with one gram of carbon, using moderate pressure, until the point is reached at which the mixture coheres in one rounded mass. However, all stages of the technique must be carefully controlled if duplicate tests by different operators are to agree within reasonable limits. The various factors are discussed in detail below.

2. Equipment (a) A 2 cc. micro-buret graduated in 0.1 cc. with a threeway stopcock. Mount buret on a ring stand and connect the side tube for filling to an overhead oil reservoir by means of Neoprene or Tygon tubing.

(b) Smooth glass plate table top.

(c) Four-inch flexible, tapered steel spatulas, Cenco No. 18755-2 (Central Scientific Company). This spatula must be used for the test.

(d) Balance—Analytical, 0.1 mg sensitivity.

3. Materials

Linseed oil—Polmerik brand, 90% raw, 10% polymerized.

Supplies: Archer-Daniels-Midland Company.

4. Procedure (a) Weigh accurately 1.000 gram of carbon black and transfer to a smooth glass plate.

(b) Using moderate pressure, crush pellets, if carbon black is in pellet form.

(c) Add the oil from the buret to the plate, not to the black. Spread the oil evenly over a circular area about 2 to 3 inches in diameter.

NOTE: For the rate of oil addition and the working time for each type, see Table No. 1.

(d) Distribute the carbon black over the oil and carefully work the mixture for 5 to 10 seconds. Use only the flexible portion of the spatula.

(e) Remove any caked carbon black from the mixing spatula with a second spatula. Rub out any lumps and make the mix reasonably uniform before adding more oil.

(f) Continue in this manner. The mix loses its fluffy appearance at a certain stage, and commences to form larger and larger beads and, finally, the single ball at the end point. This end point must be approached slowly so that the last increasement of oil is one drop or less. The final ball should be formed with no more than the usual gentle circular motion and pressure of the spatula.

(g) Record the cc of oil required for the operation.

| Table #1 | Rate of Addition-Drops | Minutes Work Time |
|---|---|---|
| GPF | 10, 10, 8, 6, 4, 1, 1 | 12 ± 1 |
| FEF | 10, 10, 8, 8, 6, 1, 1 | 13 ± 1 |
| SRF | 10, 8, 5, 1, 1, 0.5 | 9 ± 1 |

As the carbon-oil beads form during the progress of the test, excessive mixing must not be used to force them to cohere. The test shall be completed in the allocated working times, as stated in Table No. 1. Any excess of this time is an indication of excessive mixing, and a consequent low absorption.

The surprising results of these tests are shown in FIG. 3. The structure level at zero swirl was indicated by the oil absorption value of 130 cc/100 grams. Introducing swirl decreased oil absorption until a minimum oil absorption of 110 cc/100 grams was reached at S=0.3. Further increase of swirl increased oil absorption by even increments until a maximum of 150 cc/100 grams was reached at S=0.9. Further increase caused abrupt drop in oil absorption. This critical Swirl Ratio can be associated with the visual observation that a strong central reverse flow vortex is generated carrying smoke and feedstock species back into the plenum 15. These results have been consistent every time the Swirl Ratio has been controlled in this manner, although the precise values obtained will of course depend upon the specific design and operating conditions employed and the oil absorption test procedure used.

The above results are extremely beneficial in that they enable us to produce low structure carbon blacks at the Swirl Number for low oil absorption requiring less potassium additive than would otherwise be required and to produce high structure blacks at the Swirl Number for high oil absorption without having to use special feedstock injection devices like wide angle high pressure atomizing nozzles, or wide angle swirl atomizing nozzles, which are liable to produce coke on the reactor wall.

While we have thus described the preferred embodiments of the present invention, many variations will be suggested to those skilled in the art. The foregoing description and examples should therefore not be considered limitative; and all such variations and modifications as are in accord with the principles described are meant to fall within the scope of the appended claims.

We claim:

1. In a process for manufacturing carcass grades of oil furnace carbon black in which a carbon black feedstock is introduced into a elongate reactor into a reaction zone heated by hot combustion gases from the burning of a fuel with air, the improvement which comprises swirling at least a portion of the air before it contacts the fuel and controlling the Swirl Ratio of the air so as to control the structure of the resulting carbon black, said Swirl Ratio being controlled within the values wherein an increase in Swirl Ratio results in an increase in structure and a decrease in Swirl Ratio results in a decrease in structure wherein the Swirl Ratio, S is defined as:

$$S = \frac{1}{1 - \psi} \cdot \frac{\tan \cdot \delta}{1 + \tan \cdot \delta \cdot \tan \cdot (180/z)^\circ}$$

where
$\psi = zt/2\pi R_1 \cos \delta$
$\delta$ = angle of vane of radius
$R_1$ = radius of inner diameter of vane cascade, inches
$t$ = thickness of vanes, inches
$z$ = number of vanes.

2. The process of claim 1 further characterized in that the fuel and the feedstock are introduced axially into the reaction zone.

3. The process of claim 1 further characterized in that the fuel is introduced radially, and the feedstock is introduced axially into the reactor.

* * * * *